United States Patent
Bonn et al.

(10) Patent No.: US 8,510,804 B1
(45) Date of Patent: Aug. 13, 2013

(54) AUTHORIZING APPLICATION USE BY A MOBILE DEVICE

(75) Inventors: Mark J. Bonn, Granite Bay, CA (US); Dominick Mangiardi, Fremont, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1491 days.

(21) Appl. No.: 12/054,918

(22) Filed: Mar. 25, 2008

(51) Int. Cl.
*H04M 1/66* (2006.01)

(52) U.S. Cl.
USPC ............. 726/4; 709/224; 709/225; 709/229

(58) Field of Classification Search
USPC .............................. 726/4; 709/224, 225, 229
See application file for complete search history.

(56) References Cited

U.S. PATENT DOCUMENTS

| | | | |
|---|---|---|---|
| 7,142,840 B1 | 11/2006 | Geddes et al. | |
| 7,197,556 B1 * | 3/2007 | Short et al. | 709/224 |
| 7,512,405 B2 * | 3/2009 | Walsh | 455/456.1 |
| 7,697,920 B1 * | 4/2010 | McClain | 455/411 |
| 2002/0094822 A1 * | 7/2002 | Anctil et al. | 455/456 |
| 2003/0023726 A1 * | 1/2003 | Rice et al. | 709/225 |
| 2004/0242238 A1 * | 12/2004 | Wang et al. | 455/456.1 |
| 2005/0280557 A1 | 12/2005 | Jha et al. | |

* cited by examiner

*Primary Examiner* — Brandon Hoffman
*Assistant Examiner* — Samuel Ambaye

(57) ABSTRACT

A method of operating a communication system comprises receiving an authorization request from a location determination system that includes a device identifier and a port identifier and that is generated in response to receiving a location request from a communication device generated in response to a request for the location of the communication device made by an application running on the communication device. The location request includes the port identifier and the device identifier, and the device identifier identifies the communication device. The method further comprises processing the authorization request to determine an application identifier associated with the application based on the port identifier, processing the application identifier and the device identifier to determine if the application is authorized to run on the communication device, and transferring an authorization response from the authorization system that indicates if the application is authorized for the communication device.

17 Claims, 7 Drawing Sheets

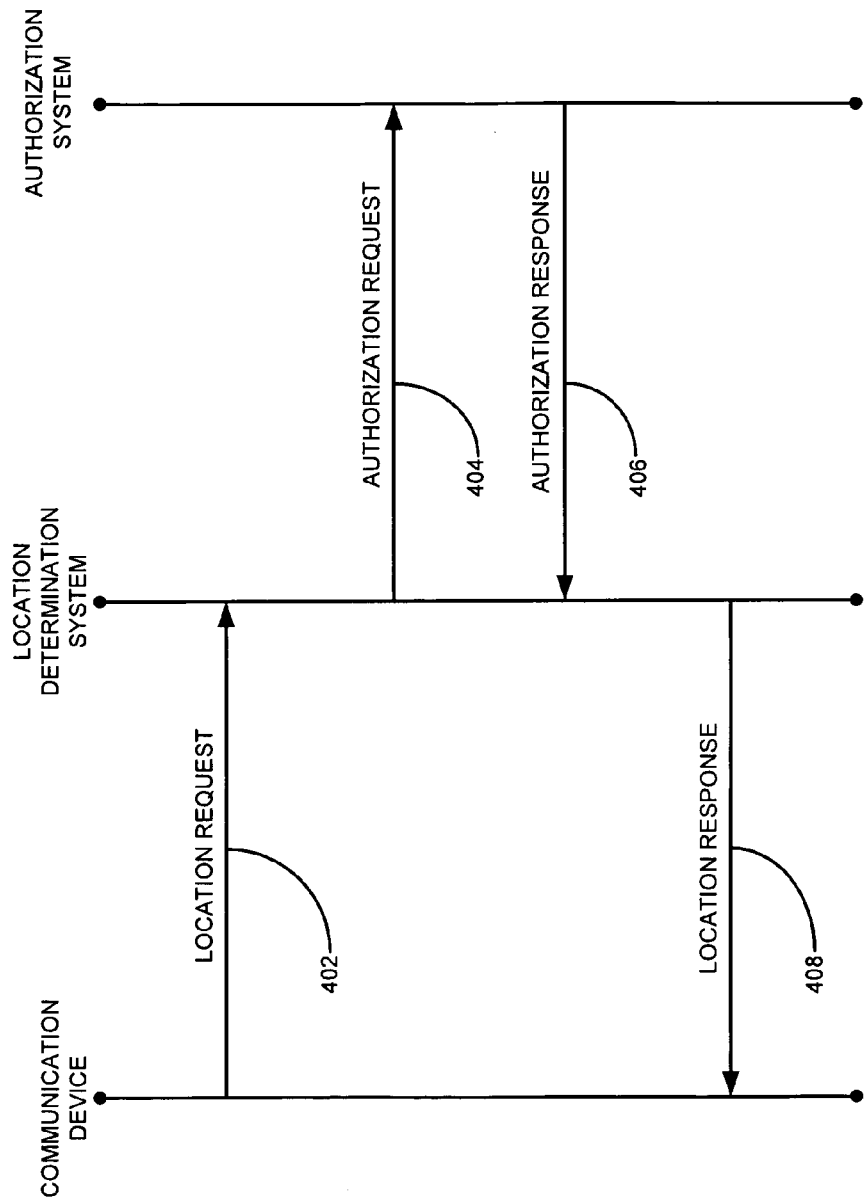

AUTHORIZING APPLICATION USE BY A MOBILE DEVICE

TECHNICAL BACKGROUND

Mobile communication devices have moved far beyond basic telephony over their decades-long development. Today's devices send and receive content of all kinds, broadly described as voice or data. Voice communications include everyday telephone calls to and from one cell phone to another or to and from a wired or "land-line" telephone and at present constitute the principle use of such devices. Data communications are on the increase, however, and can include, but are not limited to, music, video, text messages, and software.

Among presently available capabilities, today's devices can download and run software applications. These programs are typically of small size and are commonly known as applets. This ability has generated a marketplace for services for which customers can subscribe for a fee, typically on a monthly or per use basis. Some examples of such services include but are not limited to games; wireless chat rooms; personalized alerts for weather, news, traffic, sports, or the like; and geographical location services to name but a few of the available services.

Wide varieties of services are available within each category. For example, under the category of geographical location services a service provider may provide information regarding the location of the mobile device itself, directions from the mobile device to another location, or the location of another mobile device (such as one used by a minor child, for example) on the customer's service plan. Stated otherwise, the location request will fall into one of two categories: first, the location of the device making the request, or second, the location of something other than the requesting device itself, whether that is another mobile device or a specific address. Sometimes the request may include a request for directions from one to the other.

Generally speaking, a customer desiring a particular service may be required to download the appropriate applet from a service provider, which may be the communications service provider or an external service provider. Once the applet is downloaded, the service can be accessed by the customer executing the applet on the mobile device and a charge will be placed upon the customer's bill. Depending upon the service provided, a charge may be added to a customer's bill upon enrollment at a specified fee for a predetermined time period (usually a billing cycle) or on a per use basis. These fees are collected at regular intervals and accounted for. That is, the communications service provider will allocate the income from the service fees either totally to its own internal accounts if the communications service provider is providing the service applet and service or partially internally and partially to an external party there is an external party involved in providing the service. Particularly in the latter situation it is important to be able to determine which external party is providing what services and how often so that the income can be properly allocated.

When the customer makes a service request by executing a service applet, the service applet invokes the mobile device's own operating system, which transfers the request to the device's communications service provider. This request for service includes, at a minimum, an identifier specific to the device making the service request so that the service can ultimately be billed to the customer and a port designation. A port designation acts as an identifier for the particular applet being executed. As a broad analogy, the device identifier can be considered the street address of an apartment building to which a delivery is to be made and the port designation as the particular apartment (or applet) requesting the service. Previous to the applet being provided for service by the customers, the communications service provider will have assigned a specific port for use by the applet. In this manner, then, when the communications service provider receives a service request, the communications service provider can examine the request can be examined to see which port is being used by the mobile device to send the request, and, consequently, will know which service applet is requesting service. Stated otherwise, the communications service provider charges based upon which port is used to send the service request because each port is assigned to a specific service applet, such as those requesting location requests, and to no other service.

By way of example, a communications service provider may provide a location determination service through a location service provider, which provides global positioning services (GPS). Thus a customer could activate a location detection applet in a mobile communication device that would make a request for GPS location information of through the communications service provider, that is, the present assignee. Upon receipt of the location request, the communications service provider will note which port of the communication device the location request was routed through. Because the port will be exclusively assigned to, the communications service provider will know that income and expenses related to the request should be allocated according to a previous agreement between the communications service provider and for such services.

Overview

There is disclosed herein systems for and methods of operating a communication system, the method comprising receiving a location request from a communication device in a location determination system, wherein the location request is generated in response to a request for the location of the communication device made by an application running on the communication device, the location request includes a port identifier and a device identifier, and the device identifier identifies the communication device. The method further comprises transferring from the location determination system an authorization request that includes the device identifier and the port identifier, receiving the authorization request in an authorization system, processing the authorization request in the authorization system to determine an application identifier associated with the application based on the port identifier, processing the application identifier and the device identifier in the authorization system to determine if the application is authorized to run on the communication device, transferring an authorization response from the authorization system that indicates if the application is authorized for the communication device, receiving the authorization response into the location determination system, and transferring a response to the location request from the location determination system based on the authorization response.

There is also shown and described herein a communication system for determining whether to authorize a service request. The communication system comprises a location determination system configured to receive a location request from a communication device, wherein the location request is generated in response to a request for the location of the communication device made by an application running on the communication device, the location request includes a port identifier and a device identifier, and the device identifier identifies the communication device, transfer an authorization request that includes the device identifier and the port identifier, receiving an authorization response, and transfer a response to the location request based on the authorization response. The communication system further comprises an authorization system in communication with the location determination system and configured to receive the authorization request, process the authorization request to determine an application identifier associated with the application based on the port identifier, process the application identifier and the device identifier in the authorization system to determine if the application is authorized to run on the communication device, and transfer the authorization response from the authorization system that indicates if the application is authorized for the communication device.

A method of operating a communication system, the method comprising receiving an authorization request from a location determination system, wherein the authorization request includes a device identifier and a port identifier, wherein the location determination system generated the authorization request in response to receiving a location request from a communication device generated in response to a request for the location of the communication device made by an application running on the communication device, wherein the location request includes the port identifier and the device identifier, and the device identifier identifies the communication device. The method further comprises processing the authorization request to determine an application identifier associated with the application based on the port identifier, processing the application identifier and the device identifier to determine if the application is authorized to run on the communication device, and transferring an authorization response from the authorization system that indicates if the application is authorized for the communication device, wherein the location determination system receives the authorization response and transfers a response to the location request based on the authorization response.

BRIEF DESCRIPTION OF THE DRAWINGS

FIGS. 4a and 4b show examples of a communication flow in an apparatus and method according the disclosure herein.

DETAILED DESCRIPTION

Figure 1:
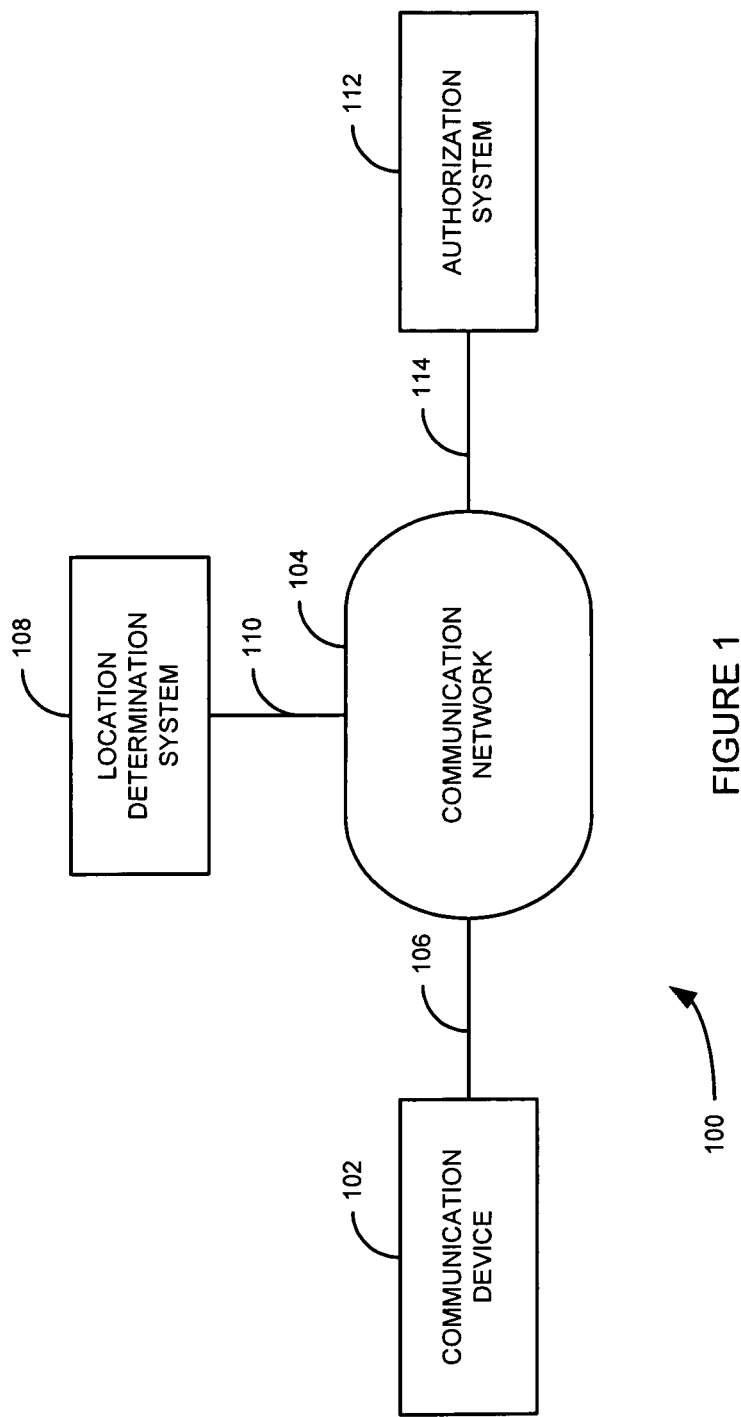
FIG. 1 is a block diagram illustrating a communication system providing a location determination service.

Many aspects of the disclosure can be better understood with reference to the accompanying drawings. The components in the drawings are not necessarily to scale, emphasis instead being placed upon clearly illustrating the principles of the present disclosure. Moreover, in the drawings, like reference numerals designate corresponding parts throughout the several views, though for purposes of clarity in describing specific figures different reference numbers may be used for the same functional component or step. While several embodiments are described in connection with these drawings, there is no intent to limit the disclosure or the scope of the claims to the embodiment or embodiments disclosed herein. On the contrary, the intent is to cover all alternatives, modifications, and equivalents, even if not explicitly or implicitly disclosed herein.

Referring to FIG. 1 an embodiment of a communication system 100 providing a location determination service is shown in a block diagram. System 100 may include a communication device 102, which may be a mobile or wireless device or a communication device connected to the system 100 via a land-line. Thus, device 102 may be connected to a communication network 104 via a connection 106, which may be a wireless connection or a wired connection to the network 104. Communication device 102 is also in communication with a location determination system 108 via a connection 110 through the network 104 and to an authorization system 112 through a connection 114. Connections 110 and 114 may be wireless or wired connections like connection 106.

In the system 100, communication device 102 will make a request for location information from location determination system 108 through network 104. Prior to transmitting the requested location information, an inquiry will be made by the location determination system 108 of the authorization system 112 to determine whether the particular communication device 102 is authorized to receive the requested information. Alternatively, the request for service could first be relayed to the authorization system 112 for authentication and authorized or denied by that system, thereby reducing load on the location determination system 108.

The rationale for including the authorization request is a simple, basic one. Occasionally skillful individuals, commonly called hackers in general parlance, are able to copy or download an application or applet directly from a device 102 that had previously received such an application or applet, and are then able to copy it to other similar devices 102. In the absence of a security measure such as the authorization system 112, such other devices are able to access the applet, here the location determination system 108, for free, avoiding the paid subscription requirement.

Figure 2:
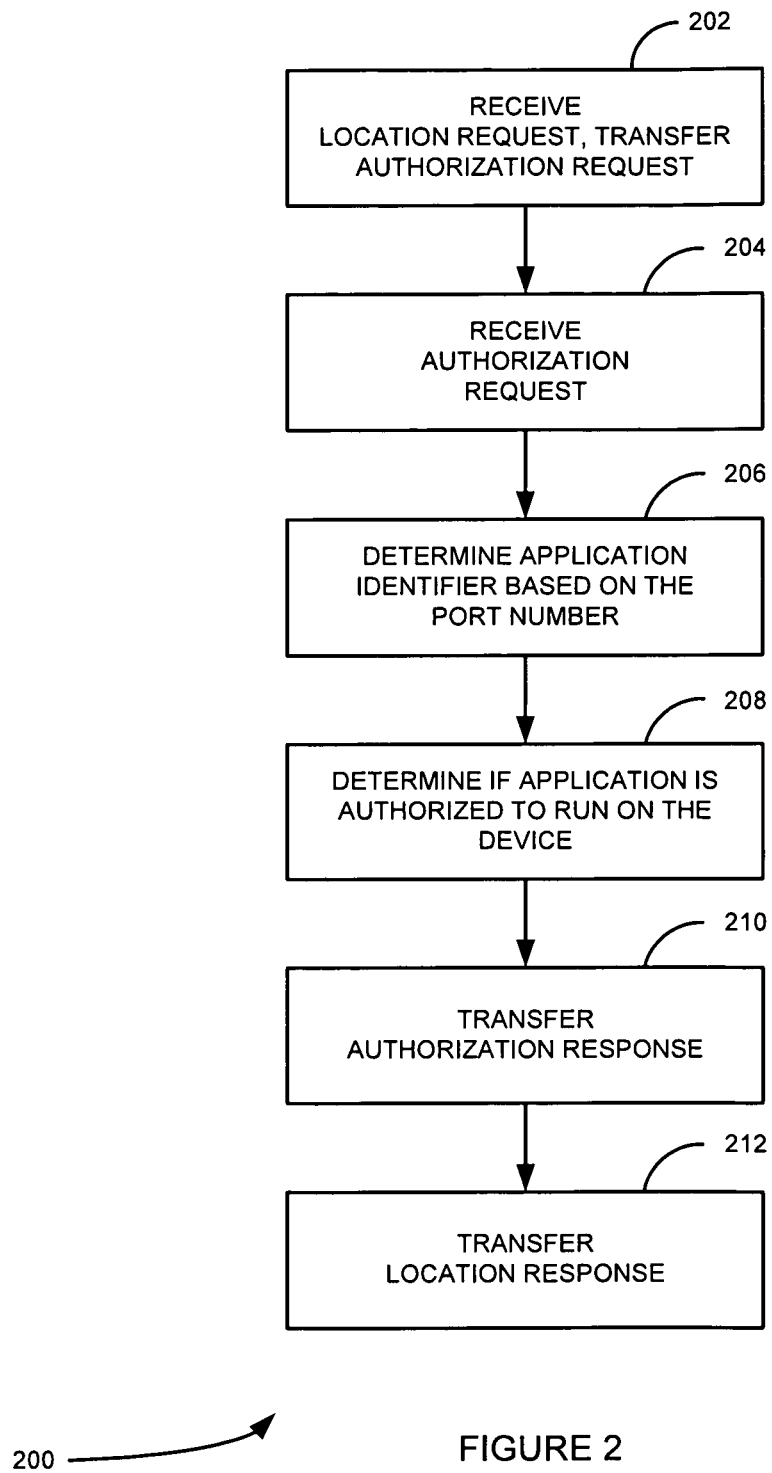
FIG. 2 is a flow diagram illustrating a method for determining if an application is authorized to run an a communications device.

Referring to FIG. 2, an embodiment 200 of a method for authenticating a service request is illustrated. As shown in the Figure, a request for a location determination will be received at step 202. Such a location request may minimally include information such as the telephone number of the particular device making the request (or some other device identifying indicator), the communication port on the mobile device 102 being used to transmit the request to the network, and the specific location information being requested, by way of example. Upon receipt of the request for a location determination, an authorization determination will be requested. The authorization request will be received at step 204. Subsequently, at step 206, the particular application for which authorization is being requested will be identified by the particular port utilized by the mobile device in making the location request. In this Figure, then, since a location request is being made, the port designation will indicate which particular service provider is associated with the applet making the location determination request.

To ensure that only validly subscribed customers are requesting access to a particular service, a determination will be made at step 208 as to whether the particular location request application is authorized to be executed on the particular mobile device making the request.

The determination step 208 will determine either that the mobile device making the request is authorized to do so or that it is not. In either event, a response with that determination will be transferred at step 210. Once the authorization response has been transferred, at step 212 either the location information requested in the location request will be transferred to the requesting device, or a denial or failure of the request for the location information will be transmitted to the requesting device.

Utilization of the method shown in FIG. 2 will prevent unauthorized access to the location determination system. The communications service provider will therefore be able to determine location determination system usage with much improved accuracy and will also see a corresponding increase in its ability to account for the income and expenses of the usage of the system.

Figure 3:
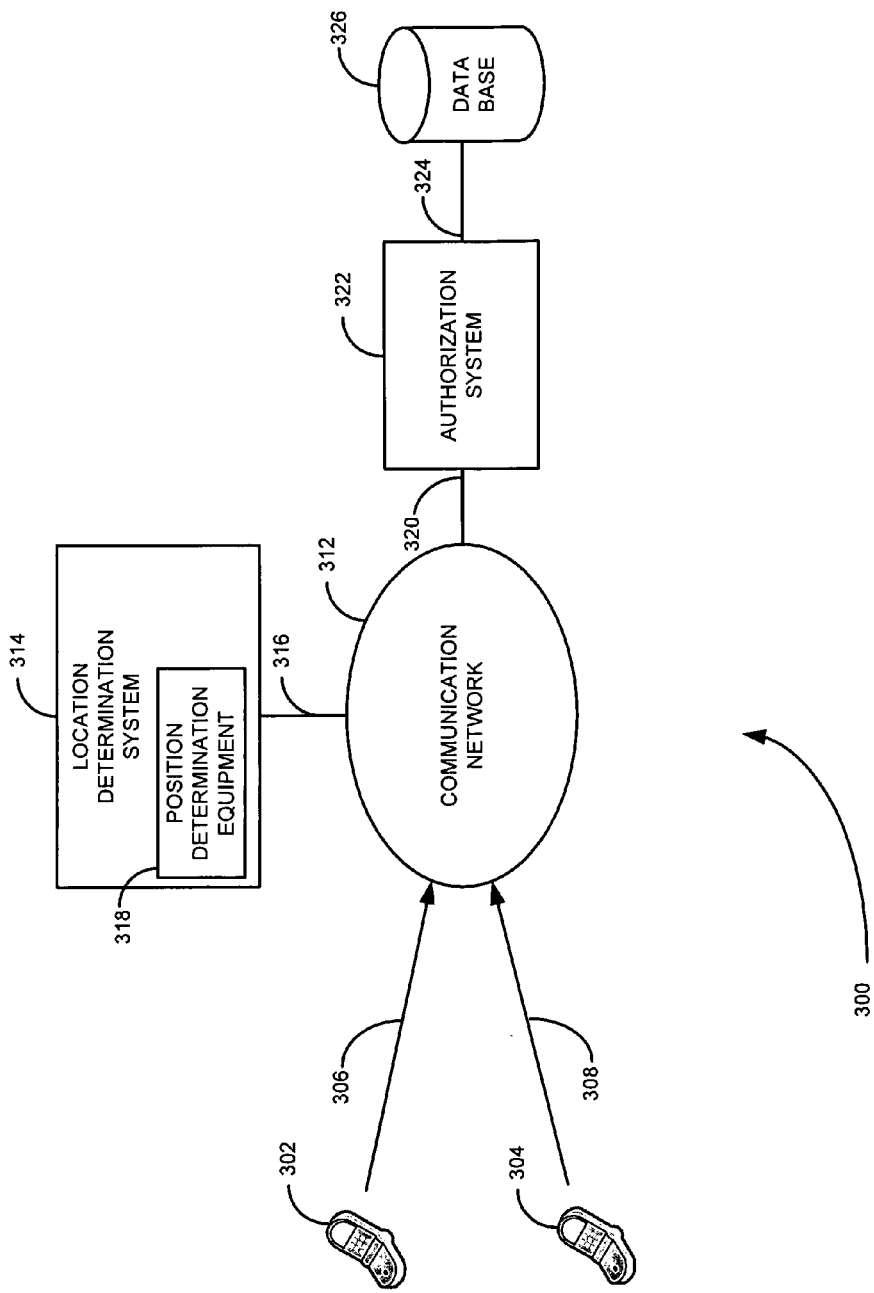
FIG. 3 is a block diagram illustrating another embodiment of a communication/authorization system.

FIG. 3 illustrates another embodiment 300 in accord with the disclosure herein. As seen in the Figure, communication devices 302 and 304 access via communication means 306 and 308, respectively, a communication network 312. Communication means 306 and 308 will typically form part of a wireless communication system, though a wired communication system is also within the scope of the present invention.

Network 312 is in communication with a location determination system 314 via communication means 316, which again may comprise wired or wireless technologies. Location determination system 314 includes position determination equipment 318. Equipment 318 will include necessary equipment to access the GPS satellite system, for example, or to provide a location through triangulation of signals received from a device whose location is of interest, or both. For example, a parent may be trying to determine the location of a mobile device carried by a child. The location of that device can be determined by equipment 318. Alternatively, a person may be trying to determine their own location or the location of a desired destination. In any such situation or similar circumstance, the equipment 318 can be used to provide location information.

The network 312 will also be in communication via a communication means 320, which again may be any form of wired or wireless communication technology, with an authorization system 322. System 322 will in turn be in communication via a communication means 324—once again any form of a wired or wireless communication technology— with a database 326. The authorization system 322 will be accessed at appropriate times to determine whether a particular party, that is, a particular device, requesting a particular service is legitimately authorized to make such a request. In the particular context of the Figure, it will be understood that such requests would relate to location determinations, though authorization systems could and can be used for other services.

Referring to FIG. 3 still, in operation a device such as device 302 may access the network 312 seeking location information of the types previously described. The request may be routed directly to the location determination system 314, which may then transmit an authorization request to the authorization system 322. Authorization system 322 may, though such may not be required in all circumstances, access the database 326 to determine if the requester device 302 is authorized to receive the requested service. If the requester device 302 is authorized to receive the requested location information, the authorization system 322 will transmit the appropriate message to location system 314. The location system 314 then utilizes position determination equipment 318 to determine the requested location information and subsequently transfers that information via the network 312 to the requester device 302. If the requester device 302 is not authorized to receive the requested location information, a denial or failure of the service request will be transmitted to the device 302 through the network 302.

Alternatively, the network 312 may first query the authorization system 322 before routing the information request to the location determination system 314. The authorization system 322 will make the appropriate determination and if the request is authorized, will forward the location request to the location determination system 314, which will in turn supply the requested information to the requesting device. If the request is not authorized, the authorization system 322 may transmit a service denial message to the mobile device 302 through the network 312.

By way of illustrating an example of the embodiment shown in FIG. 3, but not with intent to limit the embodiment in any way as well as the usefulness thereof, a communication device 302 may include software that supports mobile originated trust call flows. Such software establishes a call is trusted because the device 302 includes the location requesting software, such as a Java 2 micro-edition (J2ME) MIDlet, and because the user of the device 302 is initiating the call. Thus, no authorization checks are performed once the MIDlet is launched beyond simple checks to determine if the timestamp and digital rights management key remain valid. Because hackers have been able to "rip" the MIDlet from a device 302 and install it in another device while resetting the timestamp, the MIDlet was capable of being run on another device without paying the required subscription fees since a request received by the location determination system 314 would appear to be a trusted call.

Thus, an implementation of the embodiment shown in FIG. 3 may include the generation of location detail records that associate, at a minimum, identifying indicia (such as the telephone number assigned to the device or the MSID thereof) of the device 302, and the TCP/IP port number exclusively to the MIDlet for use whenever a location determination request is made Stated otherwise, because the port mapping is specific and exclusive to a particular MIDlet, the location detail record can then be compared against a stored record in the authorization system that associates device identifying indicia and authorized services (described in greater detail with regard to FIG. 5, below) A comparison of the two records then enables a validation or invalidation of the request. If the request is determined to come from a device unauthorized to make the request, a report can be generated and action later taken against the device user for the unauthorized attempt to use the service.

FIG. 4a generally illustrates a communication flow 400 between a device, a location determination system, and an authorization system. Thus, the communication device will send a location request 402 that is routed to a location determination system based upon the device communication port used to send the request. The location determination system will send an authorization request 404 to the authorization system, which will perform the necessary inquiries as described generally above and with more specificity below to determine if the requester device is authorized to make the location request. The result 406 of the authorization inquiry to the authentication system will be transferred to the location determination system and the location determination system will send an appropriate response 408 to the communication device. If the request is authorized, the response 408 will include the requested information and if the request is not authorized, the response 408 may include any form of response so indicating.

Figure 4B:
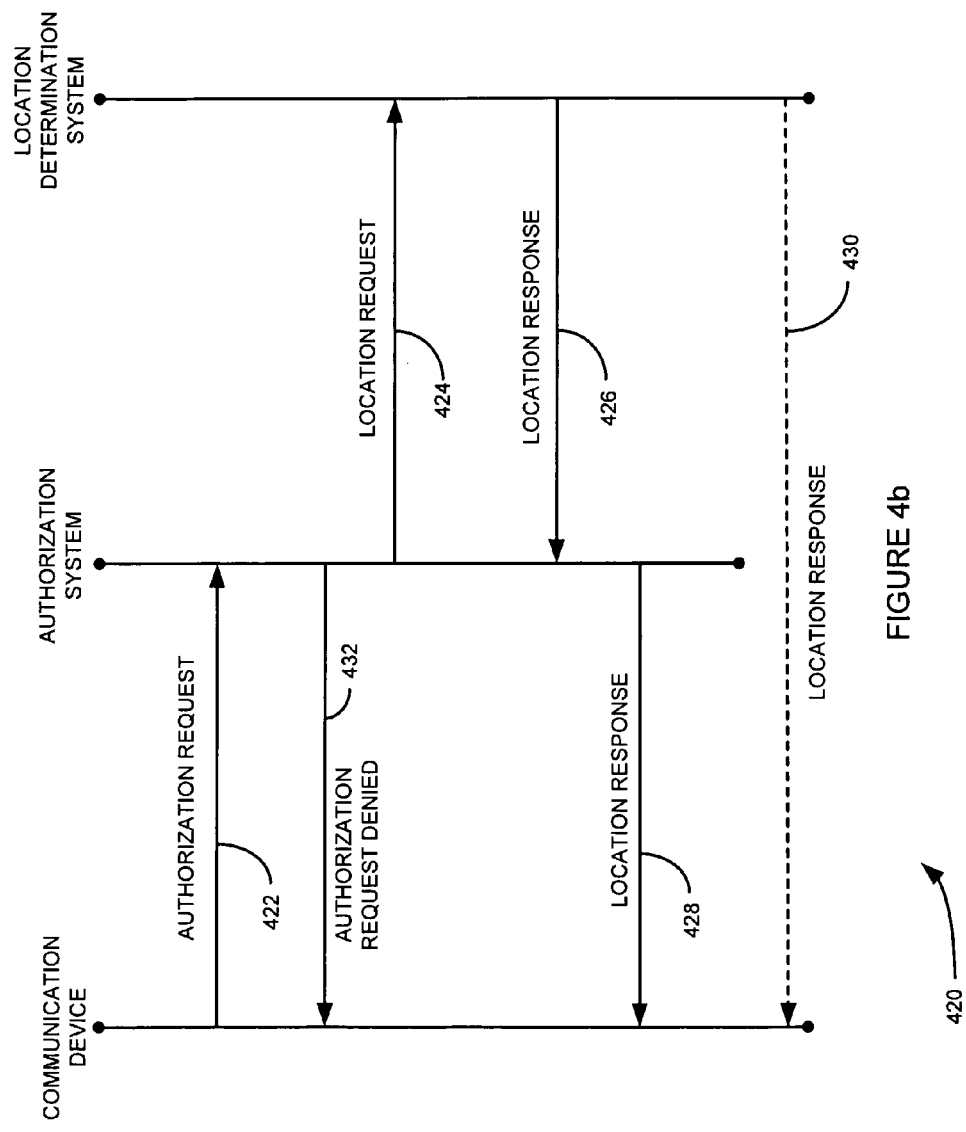

An alternative communication flow 420 in an apparatus and method for service request authentication is shown in FIG. 4b. In this embodiment a communication device makes a request 422 for authorization determination of an authorization system for the right to obtain a service such as a location determination. If the authorization system determines that the request is authorized, it will pass a request 424 for a location determination to a location determination system. The location determination system will return the requested location determination response 426 to the authorization system for transmission to the communication device as a location response 428. Alternatively, as indicated by the dotted line, the location system can pass a response 430 directly to the communication device. If the authorization system determines that the request for the location service is not authorized, the authorization service can directly inform the communication device with a location determination response 432 denying the request for location determination service. The communication flow illustrated in FIG. 4b obviates the need for querying the location determination system for invalid or otherwise unauthorized location determination requests.

Figure 5:
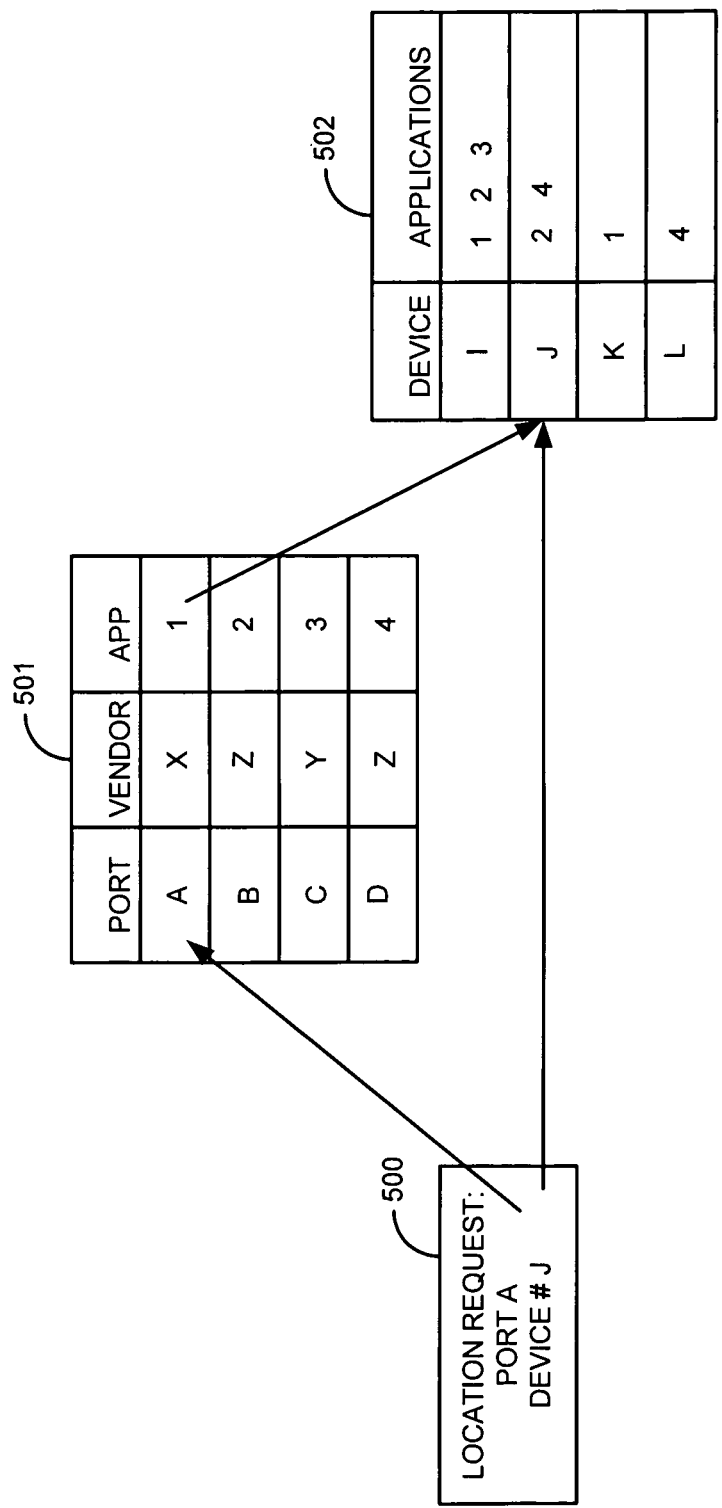
FIG. 5 is a block diagram illustrating an authorization or authentication process.

Referring now to FIG. 5, the authorization or authentication process will be generally described. It will be understood that the process described herein is meant to be exemplary only and that there are many ways to both perform the authorization inquiry and the manner in which software may be executed in performing such an authorization inquiry.

As seen in the Figure, a location request 500 will be received by a communication network and processed by an authorization or authentication system as discussed generally with regard to the Figures herein. This request 500 will include several items of information at a minimum. First, the request 500 will include some form of device identifier. As shown in the Figure, that information is generically illustrated as "Device #", here Device #J. This Device # could be a specific identification number associated with a particular communication device, the phone number of the device, or some other unique indicia of identification relating to a particular device.

Second, the request 500 will contain specific information relating to the location information requested of the type previously discussed herein. That is, the request will include a request for information relating to the location of a specific communication device, which may or may not be the device initiating the request, a request for information relating to a location that the requester is interested in finding, directions from one specific location to another, or some combination of the above.

Third, the request will contain information relating to the port a communication device used to communicate with the network. In the Figure, that port is indicated as being Port A.

As noted earlier, a communications service provider will typically provide that a particular service request relating to a particular service provider will be transmitted to the communications network via a specific port. If the request is not being made through the proper port, then, it is most likely that the mobile device is not authorized to make such a request.

Upon receipt of the authorization request, a query can be made in a database to determine whether the requesting device is in fact authorized to receive the requested information. Such a database may include, as indicated at 501, a relational mapping of data relating to port authorizations, vendors or service providers, and applications or applets provided by a particular vendor. As seen in the Figure, then, port A may be assigned for use by an APP 1 provided or issued by vendor X, by way of example. A vendor who provides more than one application, such as vendor Z, will be assigned a separate port by the communications service provider for each application that the vendor provides. Thus, APP 2 provided by vendor Z will be assigned port B for use and APP 4 provided by vendor Z will be assigned port D for use in communications regarding services associated with those applications. An authorization inquiry using the example shown at 500, then, would indicate that use of port A means that APP 1 provide by vendor X should be using that port for communication.

An additional inquiry would also be made of the database as indicated at 502. In this portion of the authorization inquiry, each device authorized to access the communications network would be mapped against the applications that the device is authorized to use. As generally illustrated at 502, Device J is authorized to use APPs 2 and 4.

Thus, in making the queries indicated at 501 and 502, it would be determined that Device J was not authorized to make the location request shown at 500. Device J is authorized only to utilize APPs 2 and 4, but the ports assigned for use with those applications, ports B and D, respectively, were not used to transmit the location request. Thus, the authorization system would transmit a "not authorized" response to the communication network and the location system would not provide the requested information.

Alternatively, had the location request 500 indicated that the request had been sent by communication device utilizing port B, the inquiry would have indicated that the request was in fact authorized since vendor Z's APP 2 is assigned to use port B and Device J is authorized to use APP 2. In that case, the authorization system would transmit a signal indicating that the communication Device J was authorized to use APP 2 and the requested service would be provided.

The process shown in FIG. 5 can be made as a single inquiry in a large database holding all of the relevant mapped data, or could be made serially in multiple databases as approval was received in each database. The overall structure and functionality of such a database can vary widely. Such an authorization system as described herein should, however, minimally include the necessary mapped data to determine if a particular request for information is being made from an device authorized to make such a request.

Figure 6:
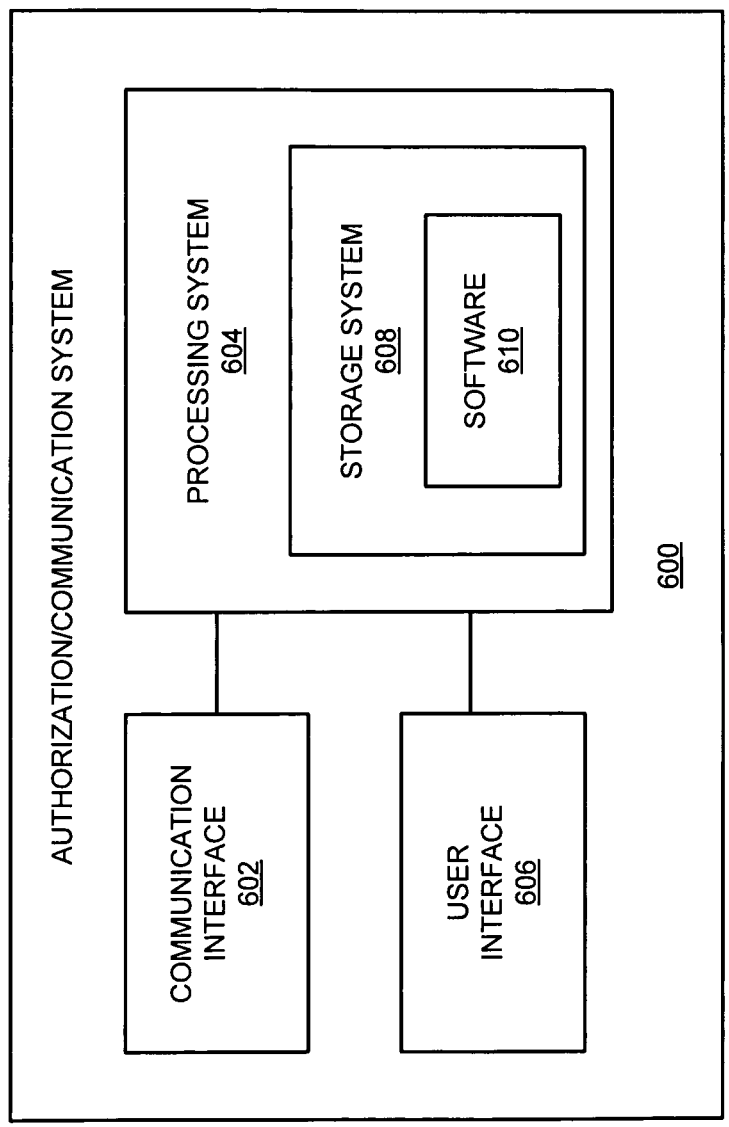
FIG. 6 is a block diagram illustrating an authorization/communication system.

With reference now to FIG. 6, there is shown a system 600 for authentication/communication that can be utilized to implement the embodiments shown herein. System 600 includes communication interface 602, processing system 604, and user interface 606. Processing system 604 includes storage system 608. Storage system 608 stores software 610. Processing system 604 is linked to communication interface 602 and user interface 606. Communication system 600 could be comprised of a programmed general-purpose computer, although those skilled in the art will appreciate that programmable or special purpose circuitry and equipment may be used. System 600 may be distributed among multiple devices that together comprise elements 602-610.

Communication interface 602 could comprise a network interface, modem, port, transceiver, or some other communication device. Communication interface 602 may be distributed among multiple communication devices. Processing system 604 could comprise a computer microprocessor, logic circuit, or some other processing device. Processing system 604 may be distributed among multiple processing devices. User interface 606 could comprise a keyboard, mouse, voice recognition interface, microphone and speakers, graphical display, touch screen, or some other type of user device. User interface 606 may be distributed among multiple user devices. Storage system 608 could comprise a disk, tape, integrated circuit, server, or some other memory device. Storage system 608 may be distributed among multiple memory devices.

Processing system 604 retrieves and executes software 610 from storage system 608. Software 610 may comprise an operating system, utilities, drivers, networking software, and other software typically loaded onto a computer system. Software 610 could comprise an application program, firmware, or some other form of machine-readable processing instructions. When executed by processing system 604, software 610 directs processing system 604 to operate as described herein.

The various embodiments described herein can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

It is important to note that while an embodiment has been described in the general context of a processing system, those of ordinary skill in the art will appreciate that the embodiments disclosed herein are capable of being distributed in a form of a computer software product comprising a computer readable medium of code or instructions for the purpose of causing a computer, whether general or special purpose, to carry out those instructions regardless of the particular type of signal bearing media actually used to carry out the distribution. Examples of computer readable media include recordable-type media such a floppy disc, a hard disk drive, a RAM, CD-ROMs, nonvolatile, hard-coded type media such as read only memories (ROMs) or erasable, electrically programmable read only memories (EEPROMs), any other form of volatile or non-volatile optical, electronic, or magnetic media, and transmission type media such as digital and analog communication links, including but limited to transmission over the Internet or other electronic distribution system (whether in the form of wired or wireless microwave, infrared or other transmission techniques) or other optical disk storage, magnetic disk storage or other magnetic storage devices, or any other medium that can be used to carry or store desired program code in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. The series of computer code or instructions embodies all or part of the functionality previously described herein with respect to the embodiments. Those skilled in the art will appreciate that such computer code or instructions can be written in a number of programming languages for use with many and varied computer architectures or operating systems.

Alternatively, the methods may be performed by specific hardware components that contain hardwired logic for performing the methods, or by any combination of programmed computer components and custom hardware components.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, the method comprising:
   receiving a location request from a communication device in a location determination system, wherein the location request is generated in response to a request for the location of the communication device made by an application running on the communication device, the location request includes a port identifier and a device identifier, and the device identifier identifies the communication device;
   transferring from the location determination system an authorization request that includes the device identifier and the port identifier;
   receiving the authorization request in an authorization system;
   processing the authorization request in the authorization system to determine an application identifier associated with the application based on the port identifier;
   processing the application identifier and the device identifier in the authorization system to determine if the application is authorized to run on the communication device;
   transferring an authorization response from the authorization system that indicates if the application is authorized for the communication device;
   receiving the authorization response into the location determination system; and
   transferring a response to the location request from the location determination system based on the authorization response.

2. The method of claim 1 wherein processing the application identifier and the device identifier to determine if the application is authorized to run on the communication device further comprises comparing the application identifier to a list of authorized applications for the communication device.

3. The method of claim 1 further comprising determining the location of the communication device if the application is authorized to run on the communication device.

4. The method of claim 1 wherein transferring a response from the location determination system based on the authorization response further comprises transferring the location of the communication device if the application is authorized to run on the communication device.

5. The method of claim 1 wherein transferring a location response from the location determination system based on the authorization response further comprises transferring a failure indication if the application is not authorized to run on the communication device.

6. The method of claim 1 wherein processing the authorization request in the authorization system to determine the application identifier associated with the application based on the port identifier comprises translating the port identifier into the application identifier based on a translations table having a plurality of port identifiers stored in association with a plurality of application identifiers.

7. The method of claim 6 wherein each of the plurality of port identifiers is stored in association with a single one of the plurality of application identifiers.

8. The method of claim 1 wherein the communication device comprises a mobile phone.

9. A communication system comprising:
- a location determination system configured to receive a location request from a communication device, wherein the location request is generated in response to a request for the location of the communication device made by an application running on the communication device, the location request includes a port identifier and a device identifier, and the device identifier identifies the communication device, transfer an authorization request that includes the device identifier and the port identifier, receiving an authorization response, and transfer a response to the location request based on the authorization response; and
- an authorization system in communication with the location determination system and configured to receive the authorization request, process the authorization request to determine an application identifier associated with the application based on the port identifier, process the application identifier and the device identifier in the authorization system to determine if the application is authorized to run on the communication device, and transfer the authorization response from the authorization system that indicates if the application is authorized for the communication device.

10. The communications system of claim 9 wherein the authorization system, to process the application identifier and the device identifier to determine if the application is authorized to run on the communication device, is configured to compare the application identifier to a list of authorized applications for the communication device.

11. The communication system of claim 9 wherein the location determination system is further configured to determine the location of the communication device if the application is authorized to run on the communication device.

12. The communications system of claim 9 wherein the location response indicates the location of the communication device if the application is authorized to run on the communication device.

13. The communications system of claim 9 wherein the location response comprises a failure indication if the application is not authorized to run on the communication device.

14. The communications system of claim 9 wherein the authorization system, to determine the application identifier associated with the application based on the port identifier, is configured to translate the port identifier into the application identifier based on a translations table having a plurality of port identifiers stored in association with a plurality of application identifiers.

15. The communications system of claim 14 wherein each of the plurality of port identifiers is stored in association with a single one of the plurality of application identifiers.

16. The communication system of claim 9 wherein the communication device comprises a mobile phone.

17. A method of operating a communication system, the method comprising:
- receiving an authorization request from a location determination system, wherein the authorization request includes a device identifier and a port identifier, wherein the location determination system generated the authorization request in response to receiving a location request from a communication device generated in response to a request for the location of the communication device made by an application running on the communication device, wherein the location request includes the port identifier and the device identifier, and the device identifier identifies the communication device;
- processing the authorization request to determine an application identifier associated with the application based on the port identifier;
- processing the application identifier and the device identifier to determine if the application is authorized to run on the communication device; and
- transferring an authorization response from the authorization system that indicates
  - if the application is authorized for the communication device, wherein the location determination system receives the authorization response and transfers a response to the location request based on the authorization response.

* * * * *